(12) United States Patent
Kuroiwa

(10) Patent No.: US 10,451,138 B2
(45) Date of Patent: Oct. 22, 2019

(54) SHOCK ABSORBER

(71) Applicant: KYB Corporation, Tokyo (JP)

(72) Inventor: Isao Kuroiwa, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/326,087

(22) PCT Filed: Jul. 15, 2015

(86) PCT No.: PCT/JP2015/070240
§ 371 (c)(1),
(2) Date: Jan. 13, 2017

(87) PCT Pub. No.: WO2016/010066
PCT Pub. Date: Jan. 21, 2016

(65) Prior Publication Data
US 2017/0211652 A1 Jul. 27, 2017

(30) Foreign Application Priority Data

Jul. 17, 2014 (JP) .................. 2014-146592

(51) Int. Cl.
*F16F 9/512* (2006.01)
*F16F 9/348* (2006.01)
*F16F 9/516* (2006.01)

(52) U.S. Cl.
CPC ............ *F16F 9/5126* (2013.01); *F16F 9/348* (2013.01); *F16F 9/3481* (2013.01);
(Continued)

(58) Field of Classification Search
CPC ........ F16F 9/5126; F16F 9/3484; F16F 9/516; F16F 9/348; F16F 2222/12; F16F 2230/40
See application file for complete search history.

(56) References Cited

U.S. PATENT DOCUMENTS 4,905,799 A * 3/1990 Yamaoka ................ F16F 9/348
188/280
6,390,257 B1 * 5/2002 Naples .................. F16F 9/3214
188/281
(Continued)

FOREIGN PATENT DOCUMENTS

JP H11-166573 A 6/1999
JP 2000-055103 A 2/2000
(Continued)

*Primary Examiner* — Xuan Lan Nguyen
(74) *Attorney, Agent, or Firm* — Rabin & Berdo, P.C.

(57) ABSTRACT

A shock absorber includes an expansion-side passage and a contraction-side passage arranged alternately side by side along a circumferential direction, seats provided to surround an outlet port of the expansion-side passage or an outlet port of the contraction-side passage, and valve bodies. The seats has an arc-shaped outer seat portion, middle seat portions extending from respective both ends in a circumferential direction of the outer seat portion toward a center axis side of the piston, and an inner seat portion extending from center axis side ends of the middle seat portions oppositely to the outer seat portion side in a circumferential direction to connect the neighboring middle seat portions. The inner seat portion is placed on a straight line that connects the center axis side ends of the middle seat portions.

13 Claims, 12 Drawing Sheets

(52) U.S. Cl.
CPC ............ *F16F 9/3484* (2013.01); *F16F 9/516* (2013.01); *F16F 2222/12* (2013.01); *F16F 2230/40* (2013.01)

(56) References Cited

U.S. PATENT DOCUMENTS

| | | | |
|---|---|---|---|
| 6,464,053 B1 * | 10/2002 | Hoebrechts | ........... F16F 9/3405 188/282.5 |
| 2008/0314704 A1 | 12/2008 | Deferme | |
| 2015/0192184 A1 | 7/2015 | Yamada | |

FOREIGN PATENT DOCUMENTS

| | | | | |
|---|---|---|---|---|
| JP | 2009-281488 A | | 12/2009 | |
| JP | 2010-169107 A | | 8/2010 | |
| JP | 2010-196798 A | | 9/2010 | |
| JP | 2011-080573 A | | 4/2011 | |
| JP | 2011-149447 A | | 8/2011 | |
| JP | 2013-068329 A | | 4/2013 | |
| JP | 2013142467 A | * | 7/2013 | .............. F16F 9/348 |
| JP | 2013142468 A | * | 7/2013 | .............. F16F 9/348 |
| WO | WO 2014-010343 A1 | | 1/2014 | |

* cited by examiner

SHOCK ABSORBER

TECHNICAL FIELD

The present invention relates to a shock absorber.

BACKGROUND ART

A shock absorber has a tubular cylinder, a piston serving as a valve disk inserted into the cylinder so as to move along an axial direction, a rod connected to the piston and provided with one end extending outward of the cylinder, two chambers partitioned by the piston and filled with a hydraulic fluid, a passage that allows these chambers to communicate with each other, and a valve body configured to open and close the passage. In this shock absorber during a telescopic motion, the valve body resists against a flow of the hydraulic fluid passing between the chambers through the passage in order to generate a damping force caused by a pressure difference between the two chambers.

For example, in a piston disclosed in JP2010-196798A, a plurality of expansion-side and contraction-side passages (hereinafter, referred to as an expansion-side passage and a contraction-side passage) penetrating the piston are arranged alternately side by side along a circumferential direction. In this piston, fan-shaped seats that individually surround an outlet port of the expansion-side passage are formed in one side of the piston as many as the number of the expansion-side passages. In the other side of the piston, fan-shaped seats that individually surround an outlet port of the contraction-side passage are formed as many as the number of the contraction-side passages. Furthermore, the piston is provided with a plurality of annular disk-shaped leaf valves. A valve body seated on and unseated from each seat opens and closes the expansion-side passage or the contraction-side passage.

In another piston disclosed in JP2011-149447A, expansion-side and contraction-side passages penetrating the piston are arranged alternately side by side along a circumferential direction. In this piston, an annular seat that integrally surrounds the outlet ports of overall expansion-side passages is formed on one side of the piston, and an annular seat that integrally surrounds the outlet ports of overall contraction-side passages is formed on the other side of the piston. In addition, the piston has a plurality of annular disk-shaped leaf valves so that a valve body seated on and unseated from each seat opens and closes the expansion-side passage or the contraction-side passage.

SUMMARY OF INVENTION

Here, in particular when the shock absorber is used for a vibration control in a chassis of an automobile, because a ride quality can be improved, it is desirable to reduce a slope of a characteristic curve of a damping force relative to a piston speed in a medium-high piston speed range, that is, set a smaller damping coefficient (a ratio of an increase amount of the damping force relative to an increase amount of the piston speed).

For example, in an independent port structure in which each passage is separated by a fan-shaped seat like a prior art disclosed in JP2010-196798A, an inlet port of an expansion-side passage or a contraction-side passage can be provided between the neighboring fan-shaped seats. For this reason, it is possible to increase a diameter of a valve body to facilitate bending of the valve body by enlarging the seat toward an outer circumference side as wide as possible. This is advantageous because the damping coefficient is reduced in the medium-high speed range as described above. However, in the independent port structure, it is impossible to enlarge a pressure-receiving area of the valve body for receiving a pressure of the chamber. Therefore, if the pressure of the chamber is not sufficiently high, the valve body is not opened, and it is difficult to sufficiently reduce the damping coefficient in the medium-high speed range.

In an annular seat structure disclosed in JP2011-149447A, in which outlet ports of an expansion-side passage or a contraction-side passage are integrally surrounded by an annular seat, it is possible to enlarge a pressure-receiving area of a valve body. However, it is necessary to arrange an inlet port of at least one of the expansion-side passage or the contraction-side passage in an outer circumference side with respect to the seat. Therefore, it is difficult to increase both diameters of the seat that surrounds the outlet port of the expansion-side passage and the seat that surrounds the outlet port of the contraction-side passage without changing a diameter of a cylinder. For this reason, the valve body is not easily bent. In also this case, it is difficult to sufficiently reduce the damping coefficient in the medium-high speed range.

A seat disclosed in FIG. 6 of JP1999-166573A includes four arc-shaped outer seat portions placed in an outer circumference side of the piston along a circumferential direction, a total of eight middle seat portions extending from both ends in a circumferential direction of these outer seat portions toward a center axis side of a piston, and four inner seat portions extending from ends of a center side of each middle seat portion oppositely to an outer seat portion side in the circumferential direction to connect the neighboring middle seat portions. The seat shape is connected like a ring. The outlet port of any one of the expansion-side passage and the contraction-side passage is placed inward of the seat and between the middle seat portions connected by the outer seat portion. In addition, the other inlet port of the expansion-side passage or the contraction-side passage is placed outward of the seat and between the middle seat portions connected by the inner seat portion.

In the configuration described above, it is possible to provide both advantages including an advantage of the independent port structure in which the diameter of the valve body can increase without changing the cylinder diameter, which is advantageous to reduce the damping coefficient in the medium-high speed range, and an advantage of the annular seat structure in which a pressure-receiving area of the valve body can be widened. Therefore, it is possible to facilitate an opening operation of the valve body.

However, in the piston described above, the inner seat portion is formed in an arc shape, and the circumferential center of the inner seat portion is warped to an outer circumference side. For this reason, the inner seat portion hinders widening of a flow passage area of the expansion-side passage or the contraction-side passage, and it is difficult to sufficiently reduce the damping coefficient in the medium-high speed range. Specifically, in order to reduce the damping coefficient in the medium-high speed range, it is effective to facilitate the opening operation of the valve body as described above and widen the flow passage area of the expansion-side passage or the contraction-side passage. In order to widen the flow passage area of the expansion-side passage or the contraction-side passage, it is desirable to widen the expansion-side passage or the contraction-side passage in an inner circumference side of the piston for securing a piston strength or the like. However, it is difficult to widen the expansion-side passage or the contraction-side passage over the inner seat portion.

That is, if the inner seat portion has a shape warped to the outer circumference side of the piston as described above, the inner seat portion hinders widening of the flow passage area of the expansion-side passage or the contraction-side passage, and it is difficult to sufficiently reduce the damping coefficient in the medium-high speed range. Note that this difficulty is not limited to a case where the valve disk configured to partition two chambers is the piston. Furthermore, this difficulty may also be generated when the seat is formed on only one side of the valve disk.

In view of the aforementioned problems, it is therefore an object of the present invention to provide a shock absorber capable of sufficiently reducing the damping coefficient in the medium-high speed range.

According to one aspect of the present invention, a shock absorber includes a valve disk configured to partition two chambers; an expansion-side passage and a contraction-side passage formed in the valve disk and arranged alternately side by side along a circumferential direction to allow the two chambers to communicate with each other; a seat formed on the valve disk to surround an outlet port of the expansion-side passage or an outlet port of the contraction-side passage; and a valve body stacked on the valve disk, the valve body being configured to open and close the expansion-side passage or the contraction-side passage. The seat includes an arc-shaped outer seat portion; middle seat portions extending from respective both ends in a circumferential direction of the outer seat portion toward a center axis side of the valve disk; and an inner seat portion extending from center axis side ends of each of the middle seat portions oppositely to the outer seat portion side in the circumferential direction to connect the neighboring middle seat portions. The outlet port of the expansion-side passage or the outlet port of the contraction-side passage is placed inward of the seat and between the middle seat portions connected by the outer seat portion. An inlet port of the contraction-side passage or an inlet port of the expansion-side passage is placed outward of the seat and between the middle seat portions connected by the inner seat portion. The inner seat portion is placed on a straight line that connects the center axis side ends of the middle seat portions or in the center axis side with respect to the straight line.

According to another aspect of the present invention, a shock absorber includes a valve disk configured to partition two chambers; an expansion-side passage and a contraction-side passage provided in the valve disk and arranged alternately side by side along a circumferential direction to allow the two chambers to communicate with each other; an expansion-side seat provided in one side of the valve disk to surround an outlet port of the expansion-side passage; a contraction-side seat provided in the other side of the valve disk to surround an outlet port of the contraction-side passage; an expansion-side valve body stacked on one side of the valve disk, the expansion-side valve body being configured to open and close the expansion-side passage; and a contraction-side valve body stacked on the other side of the valve disk, the contraction-side valve being configured to open and close the contraction-side passage. Each of the expansion-side seat and the contraction-side seat includes an arc-shaped outer seat portion; middle seat portions extending from respective both ends in a circumferential direction of the outer seat portion toward a center axis side of the valve disk; and an inner seat portion extending from center axis side ends of the middle seat portions oppositely to the outer seat portion side in the circumferential direction to connect the neighboring middle seat portions. The outlet port of the expansion-side passage is placed inward of the expansion-side seat and between the middle seat portions connected by the outer seat portion in the expansion-side seat. An inlet port of the contraction-side passage is placed outward of the expansion-side seat and between the middle seat portions connected by the inner seat portion in the expansion-side seat. The outlet port of the contraction-side passage is placed inward of the contraction-side seat and between the middle seat portions connected by the outer seat portion in the contraction-side seat. An inlet port of the expansion-side passage is placed outward of the contraction-side seat and between the middle seat portions connected by the inner seat portion in the contraction-side seat. Each of the inner seat portion of the expansion-side seat and the inner seat portion of the contraction-side seat is placed on a straight line that connects the center axis side ends of the middle seat portions or in the center axis side with respect to the straight line.

DESCRIPTION OF EMBODIMENTS

Figure 1:
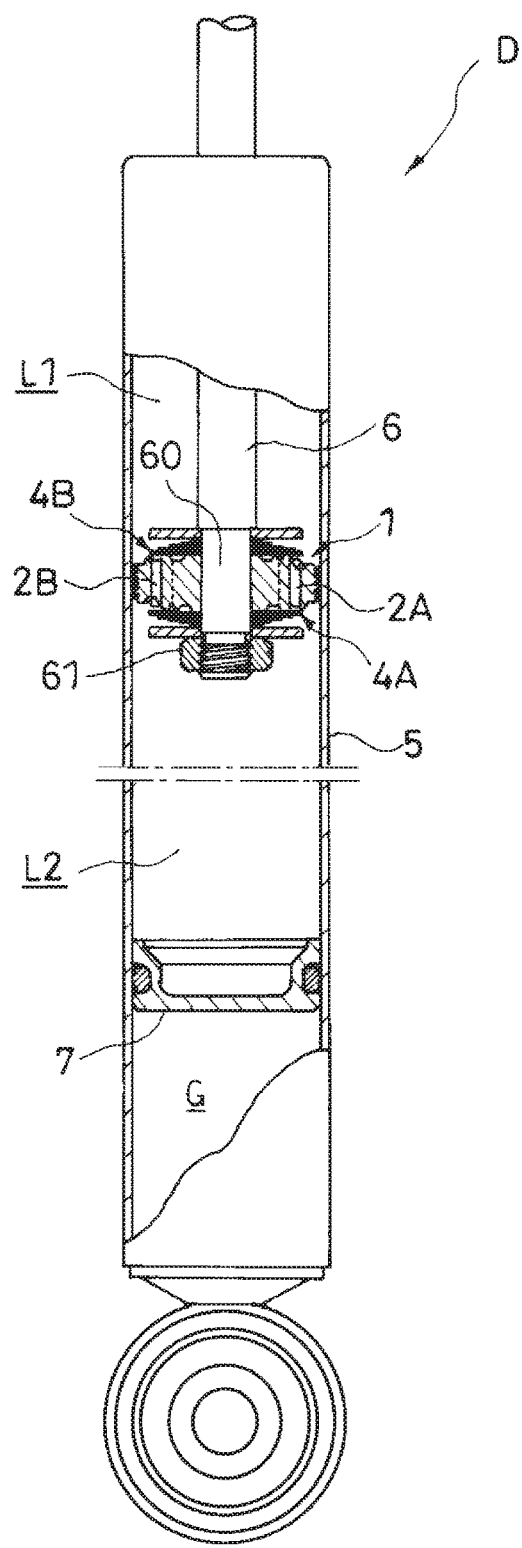
FIG. 1 is a front view illustrating a partially cut main parts of a shock absorber according to an embodiment of the present invention.

Embodiments of the present invention will now be described with reference to the accompanying drawings, in which like reference numerals denote like elements throughout several drawings.

As illustrated in FIGS. 1 to 4, a shock absorber S according to an embodiment of the present invention includes a piston (valve disk) 1 configured to partition an expansion-side chamber L1 and a contraction-side chamber L2 (two chambers), expansion-side and contraction-side passages 2A and 2B provided in the piston 1 and arranged alternately side by side along a circumferential direction to allow the expansion-side chamber L1 and the contraction-side chamber L2 to communicate with each other, seats 3A and 3B provided in the piston 1 to surround an outlet port 12 of the expansion-side passage 2A or an outlet port 15 of the contraction-side passage 2B, and valve bodies 4A and 4B stacked on the piston 1 to open and close the expansion-side passage 2A or the contraction-side passage 2B.

Each of the seats 3A and 3B has an outer seat portion 30 having an arc shape, a pair of middle seat portions 31 extending from each of both ends in a circumferential direction of the outer seat portion 30 to a center axis X side of the piston 1, and an inner seat portion 32 extending from the center axis X side ends of the middle seat portions 31 oppositely to an outer seat portion side in the circumferential direction to connect the neighboring middle seat portions 31 to each other.

The outlet port 12 of the expansion-side passage 2A or the outlet port 15 of the contraction-side passage 2B is placed inward of the seat (3A or 3B) and between the middle seat portions 31 connected by the outer seat portion 30. An inlet port 13 of the contraction-side passage 2B or an inlet port 16 of the expansion-side passage 2A is placed outward of the seat (3A or 3B) and between the middle seat portions 31 connected by the inner seat portion 32. The inner seat portion 32 is provided on a straight line Y formed by connecting the center axis X side ends of the middle seat portions 31.

The shock absorber S according to the embodiment will be described in detail. The shock absorber S is interposed between a chassis and a wheel of an automobile to absorb a vibration of the chassis. As illustrated in FIG. 1, the shock absorber S includes a tubular cylinder 5, the piston 1 slidably inserted into the cylinder 5, a rod 6 having one end connected to the piston 1 and the other end extending outward of the cylinder 5, and a free piston 7 slidably inserted into an inner circumferential surface of the cylinder 5 opposite to the rod. The two chambers (L1 and L2) partitioned by the piston 1 and filled with a hydraulic fluid are formed in the cylinder 5. In addition, a gas chamber G partitioned by the free piston 7 and filled with a gas is formed in the cylinder 5. Out of the two chambers (L1 and L2), the chamber (L2) in the piston 1 side is separated from the gas chamber G by the free piston 7. Hereinafter, out of the two chambers L1 and L2 filled with the hydraulic fluid, the chamber in the rod 6 side illustrated in the upper half of FIG. 1 will be referred to as the expansion-side chamber L1, and the chamber in the piston 1 side illustrated in the lower half of FIG. 1 will be referred to as the contraction-side chamber L2.

According to this embodiment, the cylinder 5 is connected to a wheel side, and the other end of the rod 6 protruding from the cylinder 5 is connected to a chassis side so that the shock absorber D is set as an upright type. When an impact caused by unevenness on a road surface is input to the wheel, the rod 6 accesses the cylinder 5, and the shock absorber S makes a telescopic motion. In addition, the shock absorber S is set as a mono-tube type, and a volume change inside the cylinder corresponding to a rod shift volume in the event of a telescopic motion of the shock absorber S can be compensated by expansion or contraction of the gas chamber G caused by the movement of the free piston 7.

Note that the configuration of the shock absorber S is not limited to those described above and may be appropriately changed. For example, the cylinder 5 may be connected to the chassis side, and the rod 6 may be connected to the wheel side, so that the shock absorber S is set as an inverted type. Alternatively, an outer cylinder may be provided on an outer circumference of the cylinder 5 to set the shock absorber S as a twin-tube type, and the hydraulic fluid and the gas may be sealed in a reservoir formed between the cylinder 5 and the outer cylinder in order to compensate for the volume change inside the cylinder corresponding to the rod shift volume with the reservoir. In this manner, when the shock absorber S is set as a twin-tube type, the reservoir and the contraction-side chamber L2 may be partitioned by the valve disk according to the embodiment of the present invention. Furthermore, although the hydraulic fluid is employed to generate the damping force in this embodiment, a liquid or a gas other than the hydraulic fluid may also be employed.

In this embodiment, the piston 1 slidably inserted into the cylinder 5 is the valve disk according to the present invention, and the cylinder 5 is partitioned into the two of chambers including the expansion-side chamber L1 and the contraction-side chamber L2 as described above. The piston 1 is formed in an annular shape having a center hole 10 that allows insertion of the rod 6. The piston 1 is held by a nut 61 on an outer circumference of a mounting portion 60 of the rod 6 together with the valve bodies 4B and 4A overlying and underlying the piston 1.

Figure 2:
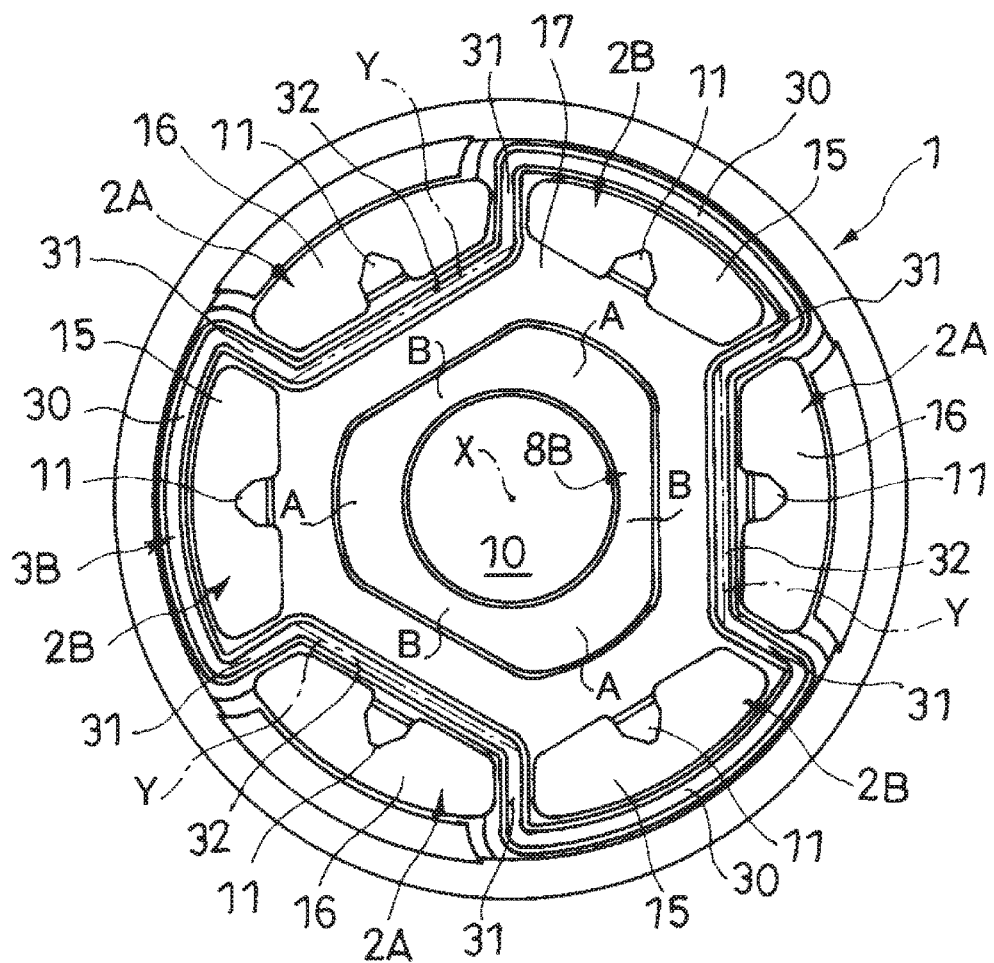
FIG. 2 is an enlarged plan view illustrating a piston of the shock absorber according to the embodiment of the present invention.
Figure 3:
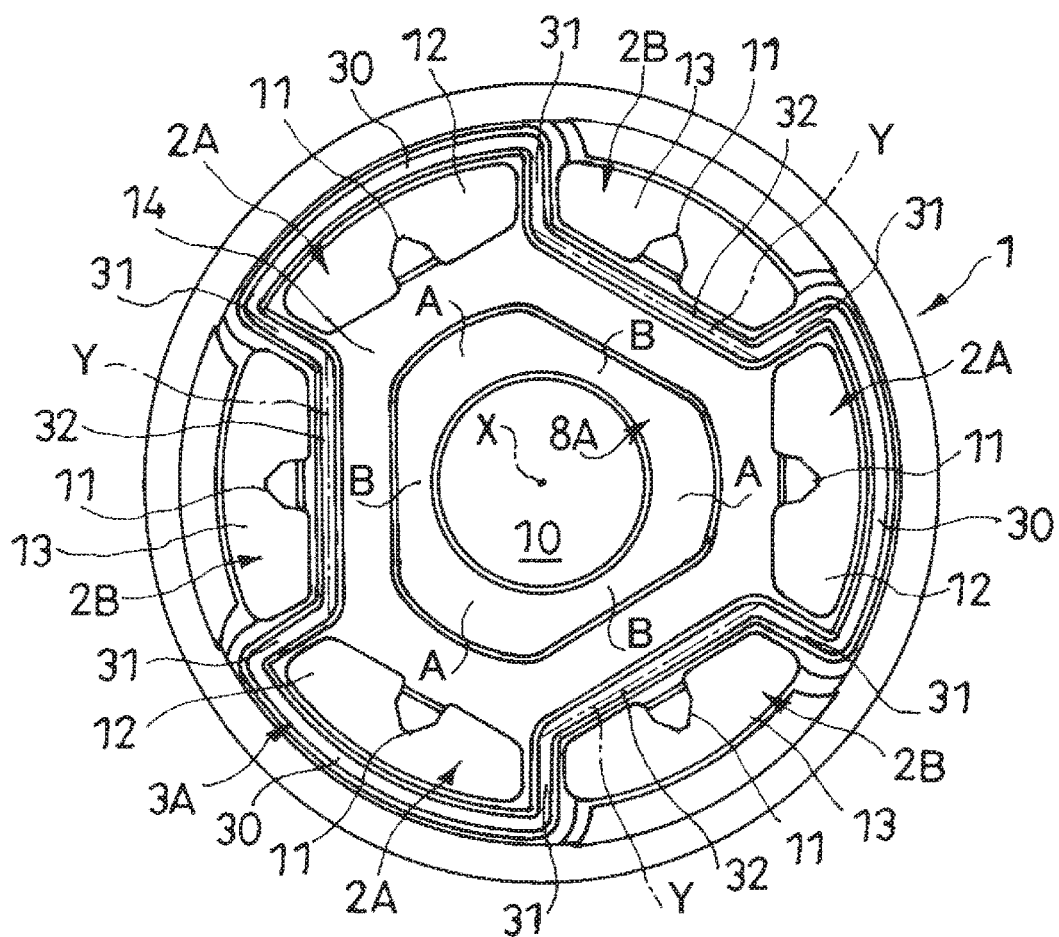
FIG. 3 is an enlarged bottom view illustrating the piston of the shock absorber according to the embodiment of the present invention.

As illustrated in FIGS. 2 and 3, the piston 1 is provided with the three expansion-side passages 2A and the three contraction-side passages 2B that axially penetrate the piston 1 and are arranged alternately side by side along the circumferential direction. In each of the expansion-side passages 2A and the contraction-side passages 2B, an island portion 11 protrudes from the center axis X side to the outer circumference side. In addition, as illustrated in FIG. 3, the seat 3A that surrounds the outlet port 12 of the expansion-side passage 2A and a boss portion 8A provided in an inner side of the seat 3A are formed below the piston 1. Meanwhile, as illustrated in FIG. 2, the seat 3B that surrounds the outlet port 15 of the contraction-side passage 2B and a boss portion 8B disposed in an inner side of the seat 3B are formed above the piston 1. Hereinafter, in order to distinguish the seats 3A and 3B, the seat 3A that surrounds the outlet port of the expansion-side passage 2A will be referred to as the expansion-side seat 3A, and the seat 3B that surrounds the outlet port of the contraction-side passage 2B will be referred to as the contraction-side seat 3B.

Figure 5:
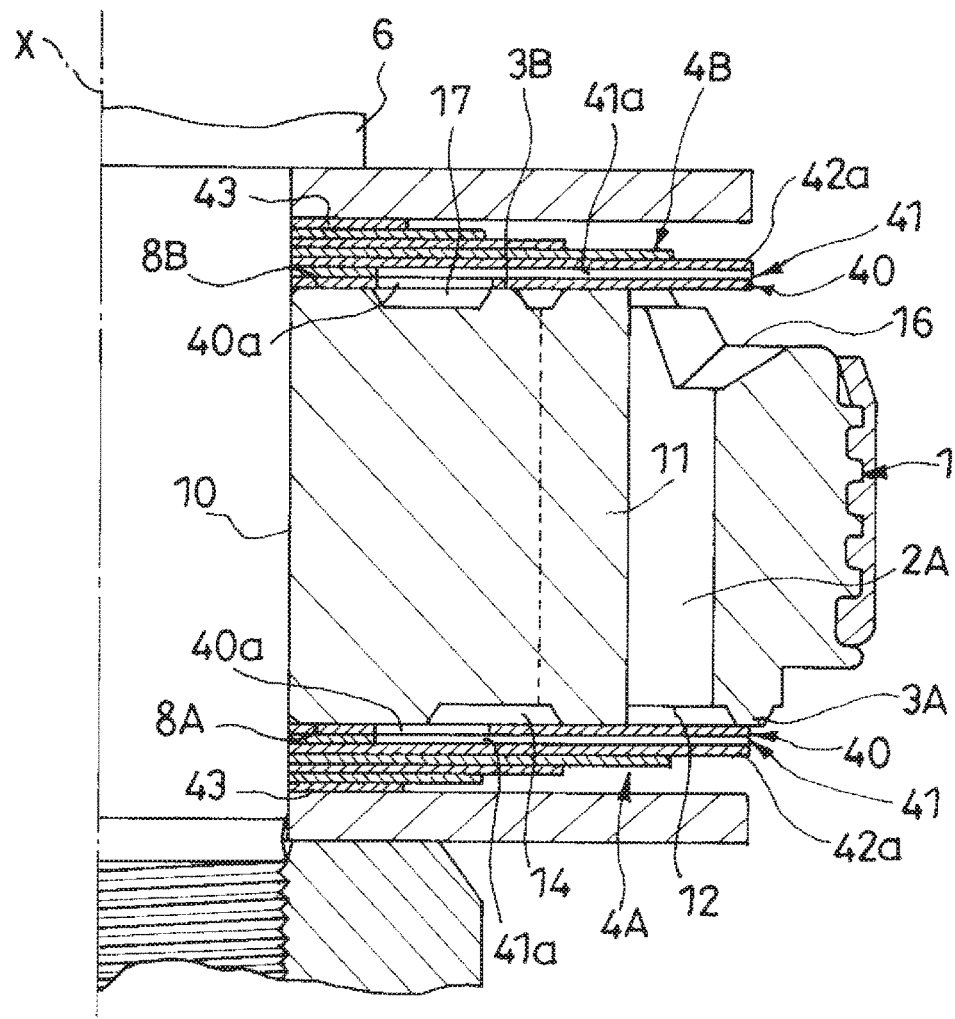
FIG. 5 is a partially enlarged view illustrating a part of FIG. 1.
Figure 6:
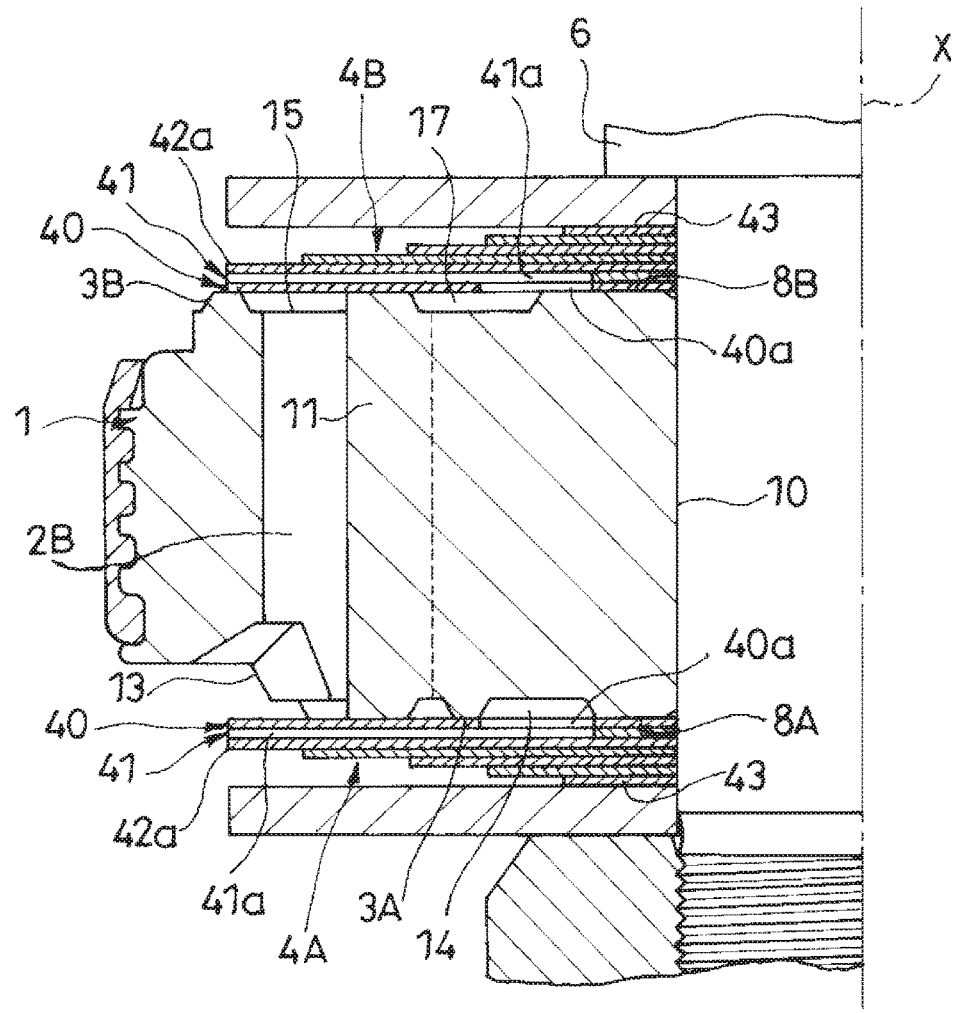
FIG. 6 is a partially enlarged view illustrating another part of FIG. 1.

The contraction-side seat 3B and the boss portion 8B formed above the piston 1 protrude upward, and the expansion-side seat 3A and the boss portion 8A formed below the piston 1 protrude downward. The island portion 11 protrudes upward and downward. As illustrated in FIGS. 5 and 6, the apexes of the contraction-side seat 3B, the boss portion 8B, and the island portion 11 protruding upward are on the same plane perpendicular to the center axis X of the piston 1. The apexes of the expansion-side seat 3A, the boss portion 8A, and the island portion 11 protruding downward are on the same plane perpendicular to the center axis X of the piston 1. That is, according to this embodiment, an initial deflection is not given to the valve bodies 4A and 4B stacked on the piston 1. Note that, in the expansion-side seat 3A and the contraction-side seat 3B, the outer seat portion 30 placed in the outer circumference side of the piston 1 as described below may protrude more than the boss portions 8A and 8B, so that an initial deflection can be given to both or any one of the valve bodies 4A and 4B.

As illustrated in FIGS. 2 and 3, each of the contraction-side seat 3B and the expansion-side seat 3A formed on and beneath the piston 1 includes the three arc-shaped outer seat portions 30, a total of six straight middle seat portions 31 extending from both ends in the circumferential direction of these outer seat portions 30 toward the center axis X side of the piston 1, and the straight inner seat portion 32 extending from the center axis X side ends of these middle seat portions 31 oppositely to the outer seat portion side in the circumferential direction to connect the neighboring middle seat portions 31, so that they form a closed ring shape. That is, the inner seat portion 32 is formed to extend oppositely to the outer seat portion 30 in the circumferential direction (oppositely to the outer seat portion side) across the middle seat portions 31.

As illustrated in FIG. 3, in the expansion-side seat 3A formed below the piston 1, the outlet port 12 of the expansion-side passage 2A is placed inward of the expansion-side seat 3A between the middle seat portions 31 connected by the outer seat portion 30. In addition, the inlet port 13 of the contraction-side passage 2B is placed outward of the expansion-side seat 3A between the middle seat portions 31 connected by the inner seat portion 32.

The outlet port 12 of the expansion-side passage 2A is opened to a window 14 formed up to an inner circumference end of the expansion-side seat 3A around the boss portion 8A and the island portion 11 protruding into the expansion-side passage 2A. When the lower valve body 4A is seated on the expansion-side seat 3A, the window 14 is closed by the valve body 4A, so that the expansion-side passage 2A is closed. In this case, an area of the portion facing the window 14 corresponds to the pressure-receiving area of the valve body 4A, and the valve body 4A receives the pressure of the expansion-side chamber L1 to open the expansion-side passage 2A. In this manner, in order to distinguish the valve body 4A that opens and closes the expansion-side passage 2A from the other valve body 4B, the valve body 4A will be hereinafter referred to as the expansion-side valve body 4A. Note that, even when the expansion-side valve body 4A is seated on the expansion-side seat 3A, the inlet port 13 of the contraction-side passage 2B is not blocked by the expansion-side valve body 4A, so that it communicates with the contraction-side chamber L2 at all times.

Meanwhile, as illustrated in FIG. 2, in the contraction-side seat 3B formed above the piston 1, the outlet port 15 of the contraction-side passage 2B is provided inward of the contraction-side seat 3B between the middle seat portions 31 connected by the outer seat portion 30. In addition, the inlet port of the expansion-side passage 2A is provided outward of the contraction-side seat 3B between the middle seat portions 31 connected by the inner seat portion 32.

The outlet port 15 of the contraction-side passage 2B is opened to a window 17 formed up to the inner circumference end of the contraction-side seat 3B around the boss portion 8B and the island portion 11 protruding into the contraction-side passage 2B. When the upper valve body 4B is seated on the contraction-side seat 3B, the window 17 is closed by the valve body 4B, so that the contraction-side passage 2B is closed. In this case, an area of the portion facing the window 17 corresponds to the pressure-receiving area of the valve body 4B, and the valve body 4B receives the pressure of the contraction-side chamber L2 to open the contraction-side passage 2B. In this manner, the valve body 4B that opens and closes the contraction-side passage 2B will be hereinafter referred to as the contraction-side valve body 4B. Note that, even when the contraction-side valve body 4B is seated on the contraction-side seat 3B, the inlet port 16 of the expansion-side passage 2A is not blocked by the contraction-side valve body 4B, so that it communicates with the expansion-side chamber L1 at all times.

According to this embodiment, the outlet port 12 and the inlet port 16 of the expansion-side passage 2A are opposed to each other above and below the piston 1. Similarly, the outlet port 15 and the inlet port 13 of the contraction-side passage 2B are opposed to each other above and below the piston 1. As a result, the expansion-side passage 2A or the contraction-side passage 2B can be formed in a straight shape along the center axis X of the piston 1. Therefore, it is possible to easily form the piston 1.

According to this embodiment, the inner seat portion 32 of the expansion-side seat 3A and the inner seat portion 32 of the contraction-side seat 3B have a straight shape and are placed on the straight line Y formed by connecting the center axis X side ends of the middle seat portions 31 arranged in both sides of the inner seat portion 32. The expansion-side passage 2A can be widened to the outer end of the inner seat portion 32 of the contraction-side seat 3B. In addition, the contraction-side passage 2B can be widened to the outer end of the inner seat portion 32 of the expansion-side seat 3A. For this reason, if the inner seat portion 32 is configured so as not to protrude over the straight line Y toward the outer circumference side of the piston 1, it is possible to increase the flow passage area of the expansion-side passage 2A or the contraction-side passage 2B.

Each of the boss portion 8A provided in the inner side of the expansion-side seat 3A and the boss portion 8B provided in the inner side of the contraction-side seat 3B is formed annularly around the center hole 10 of the piston 1. The widths of the boss portions 8A and 8B, that is, the width from the inner circumference end to the outer circumference end, are formed partially narrowed or widened. Specifically, the outer circumferences of the boss portions 8A and 8B have a rounded triangular shape, the rounded vertex portion (large diameter portion) faces the outer seat portion 30, and the linear side portion (small diameter portion) faces the inner seat portion 32. Since the center hole 10 of the piston 1 is perfectly circular to match the outer circumferential shape of the mounting portion 60 of the rod 6, the widths of the portions A of the boss portions 8A and 8B facing the outer seat portion 30 are wider than the widths of the portions B facing the inner seat portion 32.

A total of six island portions 11 each protruding into the expansion-side passage 2A and the contraction-side passage 2B are arranged alternately with the middle seat portions 31 on the same circumference. The upper parts of each island portion 11 support the contraction-side valve body 4B stacked on the piston 1 to prevent the contraction-side valve body 4B from being broken by a back pressure. The lower parts of each island portion 11 support the expansion-side valve body 4A stacked beneath the piston 1 to prevent the expansion-side valve body 4A from being broken by a back pressure.

Figure 4:
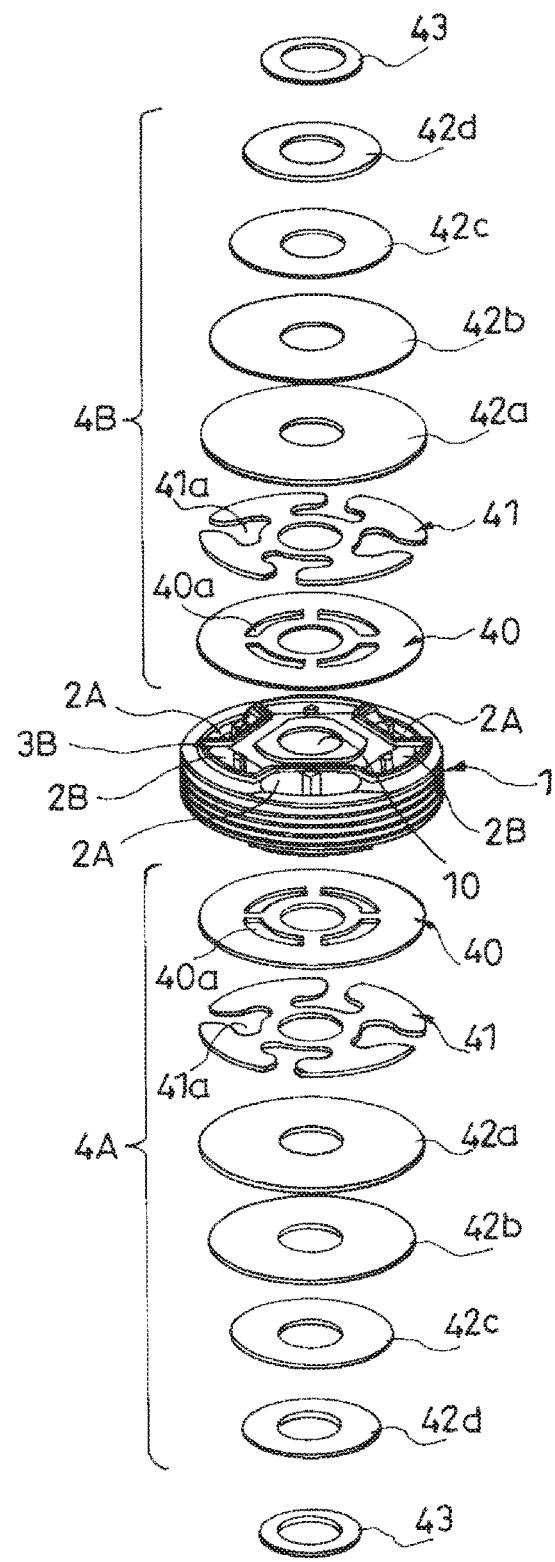
FIG. 4 is an exploded perspective view illustrating a piston and a valve body of the shock absorber according to the embodiment of the present invention.

As illustrated in FIG. 4, each of the expansion-side valve body 4A and the contraction-side valve body 4B includes, in order from the piston 1 side, a single subsidiary valve 40, a single notched leaf valve 41, a plurality of leaf valves 42a, 42b, 42c, and 42d. The subsidiary valve 40, the notched leaf valve 41, and the plurality of leaf valves 42a, 42b, 42c, and 42d are formed in an annular disk shape and have a center hole (not shown) for allowing insertion of the rod 6. In each side of the expansion-side valve body 4A and the contraction-side valve body 4B opposite to the piston, an annular spacer 43 is stacked. As illustrated in FIGS. 5 and 6, the inner circumference of the expansion-side valve body 4A is nipped and fixed between the spacer 43 and the boss portion 8A, and an inner circumference portion of the contraction-side valve body 4B is nipped and fixed between the spacer 43 and the boss portion 8B. The expansion-side valve body 4A opens the expansion-side passage 2A as its outer circumference side is bent downward over the spacer 43, so that a resistance is given to the flow of the hydraulic fluid passing through the expansion-side passage 2A. Meanwhile, the contraction-side valve body 4B opens the contraction-side passage 2B as its outer circumference side is bent upward over the spacer 43, so that a resistance is given to the flow of the hydraulic fluid passing through the contraction-side passage 2B.

Figure 7:
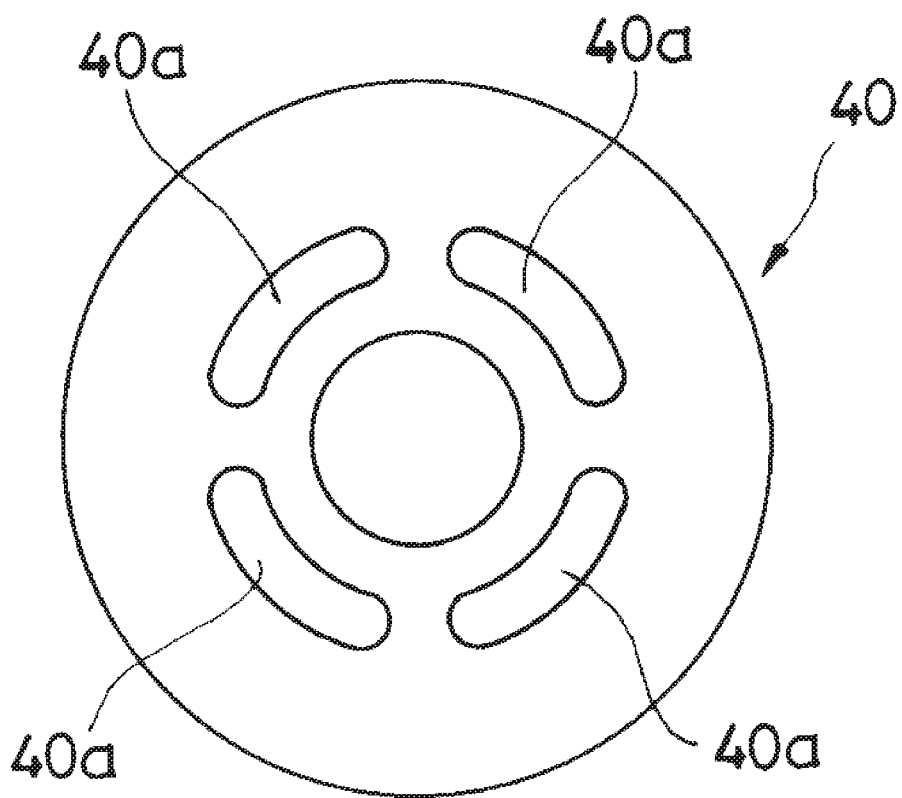
FIG. 7 is an enlarged plan view illustrating a subsidiary valve of the shock absorber according to the embodiment of the present invention.

As illustrated in FIG. 7, the subsidiary valves 40 of the expansion-side valve body 4A and the contraction-side valve body 4B are provided with four holes 40a formed at equal intervals along the circumferential direction to penetrate the subsidiary valve 40 in the a thickness direction. The holes 40a are each formed in an arc shape and are arranged on the same circumference. As illustrated in FIGS. 5 and 6, in the expansion-side valve body 4A, the hole 40a of the subsidiary valve 40 faces the inner side of the expansion-side seat 3A. The expansion-side passage 2A having the outlet port 12 connected to the inner side of the expansion-side seat 3A communicates with the hole 40a of the subsidiary valve 40 of the expansion-side valve body 4A at all times. Meanwhile, in the contraction-side valve body 4B, the hole 40a of the subsidiary valve 40 faces the inner side of the contraction-side seat 3B. The contraction-side passage 2B having the outlet port 15 connected to the inner side of the contraction-side seat 3B communicates with the hole 40a of the subsidiary valve 40 of the contraction-side valve body 4B at all times.

Figure 8:
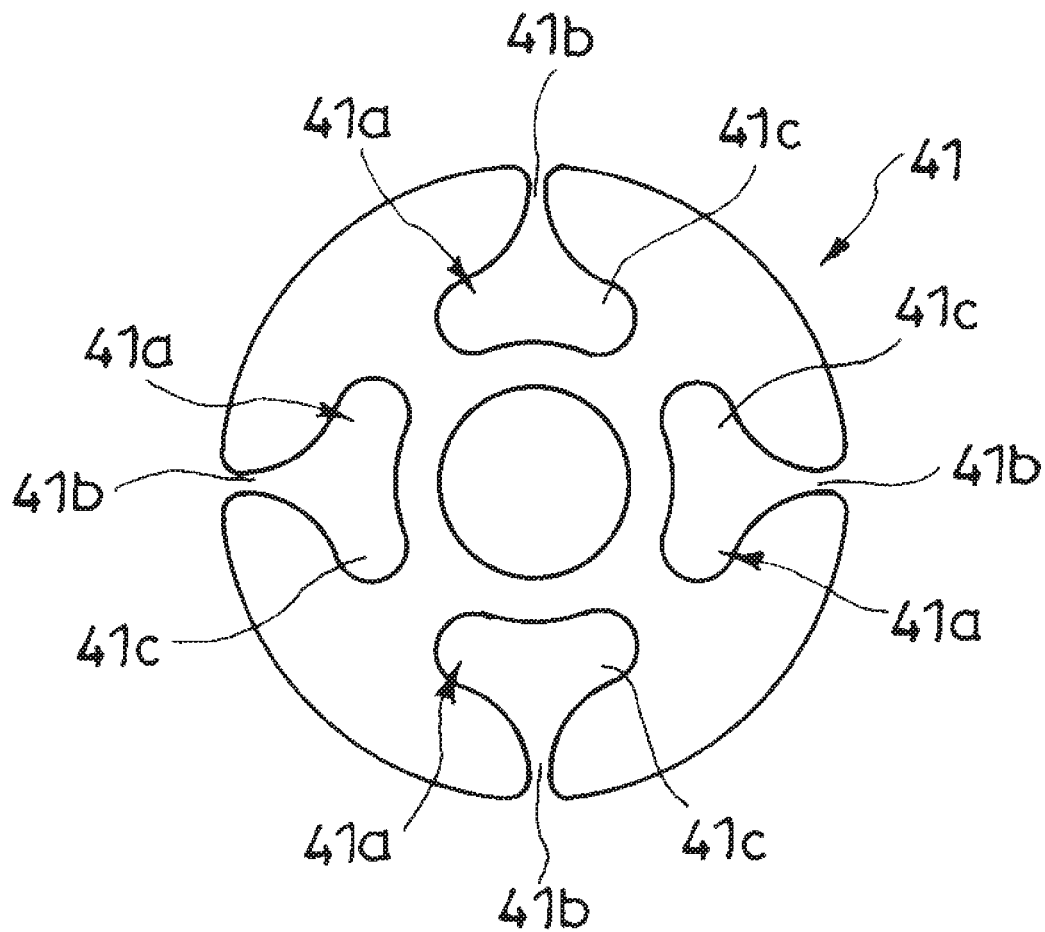
FIG. 8 is an enlarged plan view illustrating a notched leaf valve of the shock absorber according to the embodiment of the present invention.

As illustrated in FIG. 8, the notched leaf valve 41 stacked on the subsidiary valve 40 is provided with four notches 41a formed to extend from the outer circumference end of the notched leaf valve 41 toward the center at equal intervals along the circumferential direction. Each of the notches 41a has a narrow strait portion 41b provided in the outer circumference side and a wide communicating portion 41c provided in the center side to face the hole 40a when it is installed in the piston 1.

The first leaf valve 42a stacked on the notched leaf valve 41, the notched leaf valve 41, and the subsidiary valve 40 have approximately the same diameter. Since the notched leaf valve 41 is inserted between the subsidiary valve 40 and the first leaf valve 42a, the upper and lower parts of the strait portion 41b of the notched leaf valve 41 are blocked by the outer circumferences of the subsidiary valve 40 and the first leaf valve 42a. As a result, the strait portion 41b of the notch 41a forms an orifice serving as a throttle flow channel.

In the configuration described above, even when the subsidiary valve 40 of the expansion-side valve body 4A is seated on the expansion-side seat 3A, and the expansion-side valve body 4A closes the expansion-side passage 2A, the throttle flow channel formed by the strait portion 41b communicates with the contraction-side chamber L2 at all times and also communicates with the expansion-side chamber L1 through the communication portion 41c, the hole 40a, the window 14, and the expansion-side passage 2A at all times. Meanwhile, even when the subsidiary valve 40 of the contraction-side valve body 4B is seated on the contraction-side seat 3B, and the contraction-side valve body 4B closes the contraction-side passage 2B, the throttle flow channel formed by the strait portion 41b communicates with the expansion-side chamber L1 at all times, and also communicates with the contraction-side chamber L2 at all times through the communicating portion 41c, the hole 40a, the window 17, and the contraction-side passage 2B. That is, according to this embodiment, the expansion-side chamber L1 and the contraction-side chamber L2 communicate with each other through the throttle flow channel at all times even when the expansion-side valve body 4A and the contraction-side valve body 4B are closed.

As described above, since the boss portions 8A and 8B have a rounded triangular shape, the overlapping area between the boss portions 8A and 8B and the hole 40a is reduced. Therefore, it is possible to maximize the opening area of the hole 40a. In addition, since the wide portion (first portion) A faces the outer seat portion 30, and the strait portion (second portion) B faces the inner seat portion 32, it is possible to secure an area of the boss portions 8A and 8B for supporting the expansion-side valve body 4A or the contraction-side valve body 4B to receive a load applied when they are fixed to the piston. Furthermore, it is possible to prevent a difficulty in the flow of the hydraulic fluid that may be generated when a gap between the boss portions 8A and 8B and the inner seat portion 32 is reduced.

Here, according to this embodiment, the number of the expansion-side passages 2A, the number of the contraction-side passages 2B, the numbers of the outer seat portions 30 and the inner seat portions 32 of the expansion-side seat 3A, and the numbers of the outer seat portions 30 and the inner seat portions 32 of the contraction-side seat 3B are the same. If this number is set to "N," the aforementioned effects can be obtained by forming the boss portions 8A and 8B in a rounded N-polygonal shape, allowing the rounded vertex portion to face the outer seat portion 30, and allowing the straight side portion to face the inner seat portion 32. Note that, if the number "N" increases, the flow passage area of the expansion-side passage 2A or the contraction-side passage 2B decreases, and the damping coefficient in the medium-high piston speed range increases. For this reason, in order to reduce the damping coefficient, it is desirable to set the number "N" to 2 to 4 (N=2 to 4), most desirably, "N=3." Alternatively, the number "N" may be appropriately changed.

The throttle flow channel (orifice) may also be formed by stamping any one or both of the expansion-side seat 3A and the contraction-side seat 3B. However, in this case, when it is desired to adjust the flow passage area of the orifice or the like, it is necessary to make a variation of the mold for forming the piston 1. This reduces the degree of freedom in adjustment of the throttle flow channel in terms of cost. In contrast, if the throttle flow channel (orifice) is formed by using the notched leaf valve 41 as described above, it is possible to improve accuracy of the throttle flow channel, inexpensively make a variation of the notched leaf valve 41, and improve the degree of freedom in setting of the throttle flow channel.

According to this embodiment, the subsidiary valve 40 is provided in the piston 1 side of the notched leaf valve 41. The hole 40a of the subsidiary valve 40 faces the inner side of the expansion-side seat 3A or the inner side of the contraction-side seat 3B and also faces the notch 41a of the notched leaf valve 41. For this reason, according to this embodiment, it is possible to allow the throttle flow channel to communicate with the expansion-side passage 2A or the contraction-side passage 2B without aligning the notched leaf valve 41 and the piston 1 in the circumferential direction. Note that, if the notched leaf valve 41 and the piston 1 are aligned in the circumferential direction such that the strait portion 42b of the notch 41a overlaps the outer seat portion 30 at all times, the subsidiary valve 40 may not be provided. Alternatively, the number of the stacked leaf valves 42a, 42b, . . . may also be appropriately changed, and the configurations of the expansion-side valve body 4A and the contraction-side valve body 4B may be appropriately changed without limiting to those described above.

Operations of the shock absorber S according to this embodiment will now be described.

When the piston 1 moves to the upper side in FIG. 1, the shock absorber S expands, and the rod 6 retreats from the cylinder 5, the hydraulic fluid of the contracted expansion-side chamber L1 moves to the expanding contraction-side chamber L2. When the piston speed is in the low speed range during expansion of the shock absorber S, the hydraulic fluid in the expansion-side chamber L1 passes through a throttle flow channel (orifice) formed by the strait portion 41$b$ and moves to the contraction-side chamber L2.

When the shock absorber S expands, the piston speed increases to the medium-high speed range, and the pressure of the expansion-side chamber L1 increases over the pressure of the contraction-side chamber L2 by a predetermined amount or more, the outer circumference of the expansion-side valve body 4A is bent downward. As a result, a gap is generated between the subsidiary valve 40 of the expansion-side valve body 4A and the expansion-side seat 3A, and the hydraulic fluid passes through the gap and moves from the expansion-side chamber L1 to the contraction-side chamber L2.

On the contrary, when the piston 1 moves to the lower side in FIG. 1, the rod 6 advances to the cylinder 5, and the shock absorber S contracts, the hydraulic fluid of the contracting contraction-side chamber L2 moves to the expanding expansion-side chamber L1. When the piston speed is in the low speed range during the contraction of the shock absorber S, the hydraulic fluid of the contraction-side chamber L2 passes through the throttle flow channel formed by the strait portion 41$b$ and moves to the expansion-side chamber L1.

When the shock absorber S contracts, the piston speed increases to the medium-high speed range, and the pressure of the contraction-side chamber L2 increases over the pressure of the expansion-side chamber L1 by a predetermined amount or more, the outer circumference of the contraction-side valve body 4B is bent upward. As a result, a gap is generated between the subsidiary valve 40 of the contraction-side valve body 4B and the contraction-side seat 3B, and the hydraulic fluid passes through the gap and moves from the contraction-side chamber L2 to the expansion-side chamber L1.

Figure 9:
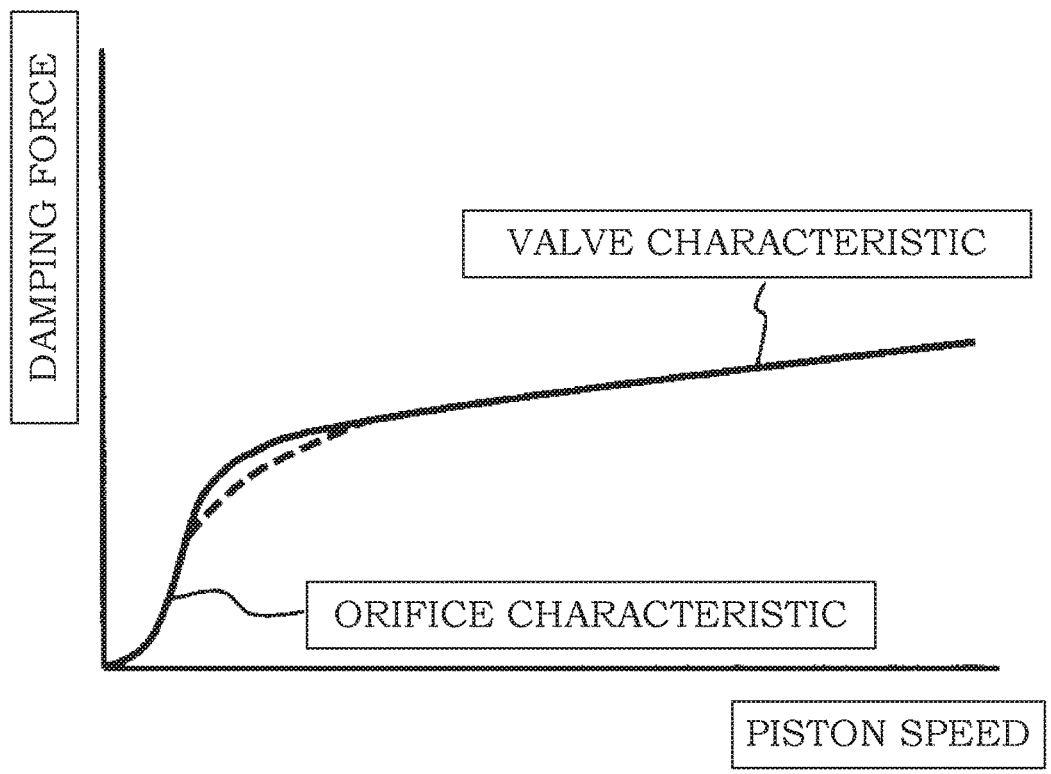
FIG. 9 is a graph illustrating a characteristic of a damping force of the shock absorber according to the embodiment of the present invention.

That is, when the piston speed is in the low speed range during a telescopic motion of the shock absorber S, as indicated by the solid line in FIG. 9, the shock absorber S generates a damping force having an orifice characteristic caused by the resistance of the throttle flow channel (orifice) formed by the strait portion 41$b$. When the piston speed is in the medium-high speed range during a telescopic motion of the shock absorber S, the shock absorber S generates a damping force having a valve characteristic caused by the resistance of the expansion-side valve body 4A or the contraction-side valve body 4B. Note that, although the piston speed range is divided into the low speed range and the medium-high speed range in this embodiment, the threshold value for each range may be arbitrarily set.

According to this embodiment, the expansion-side seat 3A where the expansion-side valve body 4A is seated and unseated has the outer seat portion 30, the middle seat portions 31, and the inner seat portion 32 to form a closed shape such as a ring. This makes it possible to enlarge the window 14 formed in the inner side of the expansion-side seat 3A and increase the pressure-receiving area of the expansion-side valve body 4A for receiving the pressure of the expansion-side chamber L1. For this reason, even when the pressure of the expansion-side chamber L1 is low, the expansion side valve body 4A can be opened. Similarly, the contraction-side seat 3B where the contraction-side valve body 4B is seated and unseated has the outer seat portion 30, the middle seat portions 31, and the inner seat portion 32 to form a closed shape such as a ring. This makes it possible to enlarge the window 17 formed in the inner side of the contraction-side seat 3B and increase the pressure-receiving area of the contraction-side valve body 4B for receiving the pressure of the contraction-side chamber L2. Therefore, even when the pressure of the contraction-side chamber L2 is low, the contraction-side valve body 4B can be opened.

In the expansion-side seat 3A, the outlet port 12 of the expansion-side passage 2A is provided between the middle seat portions 31 connected by the outer seat portion 30, and the inlet port 13 of the contraction-side passage 2B is provided between the middle seat portions 31 connected by the inner seat portion 32. For this reason, it is possible to widen the expansion-side seat 3A to the outer circumference side of the piston 1 and increase the diameter of the expansion-side valve body 4A without enlarging the cylinder diameter. This allows the expansion-side valve body 4A to be easily bent. Similarly, in the contraction-side seat 3B, the outlet port 15 of the contraction-side passage 2B is provided between the middle seat portions 31 connected by the outer seat portion 30, and the inlet port 16 of the expansion-side passage 2A is provided between the middle seat portions 31 connected by the inner seat portion 32. For this reason, it is possible to extend the contraction-side seat 3B to the outer circumference side of the piston 1 and increase the diameter of the contraction-side valve body 4B without enlarging the cylinder diameter. This allows the contraction-side valve body 4B to be easily bent.

According to this embodiment, the inner seat portion 32 of the expansion-side seat 3A is provided on the straight line Y formed by connecting the center axis X side ends of the middle seat portions 31 to each other. As a result, it is possible to widen the flow passage area of the contraction-side passage 2B toward the inner circumference side of the piston 1 while the inner seat portion 32 does not protrude to the outer circumference side of the piston 1. Similarly, the inner seat portion 32 of the contraction-side seat 3B is provided on the straight line Y formed by connecting the center axis X side ends of the middle seat portions 31 to each other. As a result, it is possible to widen the flow passage area of the expansion-side passage 2A toward the inner circumference side of the piston 1 while the inner seat portion 32 does not protrude to the outer circumference side of the piston 1.

In the configuration described above, as illustrated in FIG. 9, it is possible to sufficiently reduce the damping coefficient by reducing a slope of the characteristic curve expressing the damping force against the piston speed when the piston speed is in the medium-high speed range. For this reason, it is possible to improve a ride quality by applying the shock absorber S according to this embodiment to a vibration control in a chassis of an automobile.

According to this embodiment, while the pressure-receiving area of the expansion-side valve body 4A that opens and closes the expansion-side passage 2A increases, the expansion-side valve body 4A is supported by the island portion 11. As a result, it is possible to suppress the expansion-side valve body 4A from being bent toward the piston 1 side and being broken by the pressure of the contraction-side chamber L2 serving as a back pressure of the expansion-side valve body 4A even when this pressure increases. Similarly, while the pressure-receiving area of the contraction-side valve body 4B that opens and closes the contraction-side passage 2B increases, the contraction-side valve body 4B is supported by the island portion 11. As a result, it is possible to suppress the contraction-side valve body 4B from being bent toward the piston 1 side and being broken by the pressure of the expansion-side chamber L1 serving as the back pressure of the contraction-side valve body 4B even when this pressure increases.

Functional effects of the shock absorber S according to this embodiment will now be described.

According to this embodiment, the piston (valve disk) 1 has the boss portion 8A provided in the inner side of the expansion-side seat 3A and the boss portion 8B provided in the inner side of the contraction-side seat 3B. In each of the boss portions 8A and 8B, the width of the portion A facing the outer seat portion 30 is wider than the width of the portion B facing the inner seat portion 32.

In the configuration described above, it is possible to reduce the overlapping area between the hole 40a of the subsidiary valve 40 and the boss portions 8A and 8B and increase the distance from the boss portions 8A and 8B to the inner seat portion 32. Therefore, it is possible to minimize the resistance generated when the hydraulic fluid moves through the hole 40a or the windows 14 and 17. In addition, since the wide portion A is formed in the boss portions 8A and 8B, it is possible to increase the area of the portion supporting the expansion-side valve body 4A and receiving a load generated by fixing the piston and the area of the portion supporting the contraction-side valve body 4B and receiving a load generated by fixing the piston. Note that the shapes of the boss portions 8A and 8B are not limited to those described above, and may be appropriately changed. Alternatively, any one or both of the boss portions 8A and 8B may be formed in a perfect circle shape.

According to this embodiment, the middle seat portions 31 are arranged at equal intervals in the circumferential direction.

Figure 10:
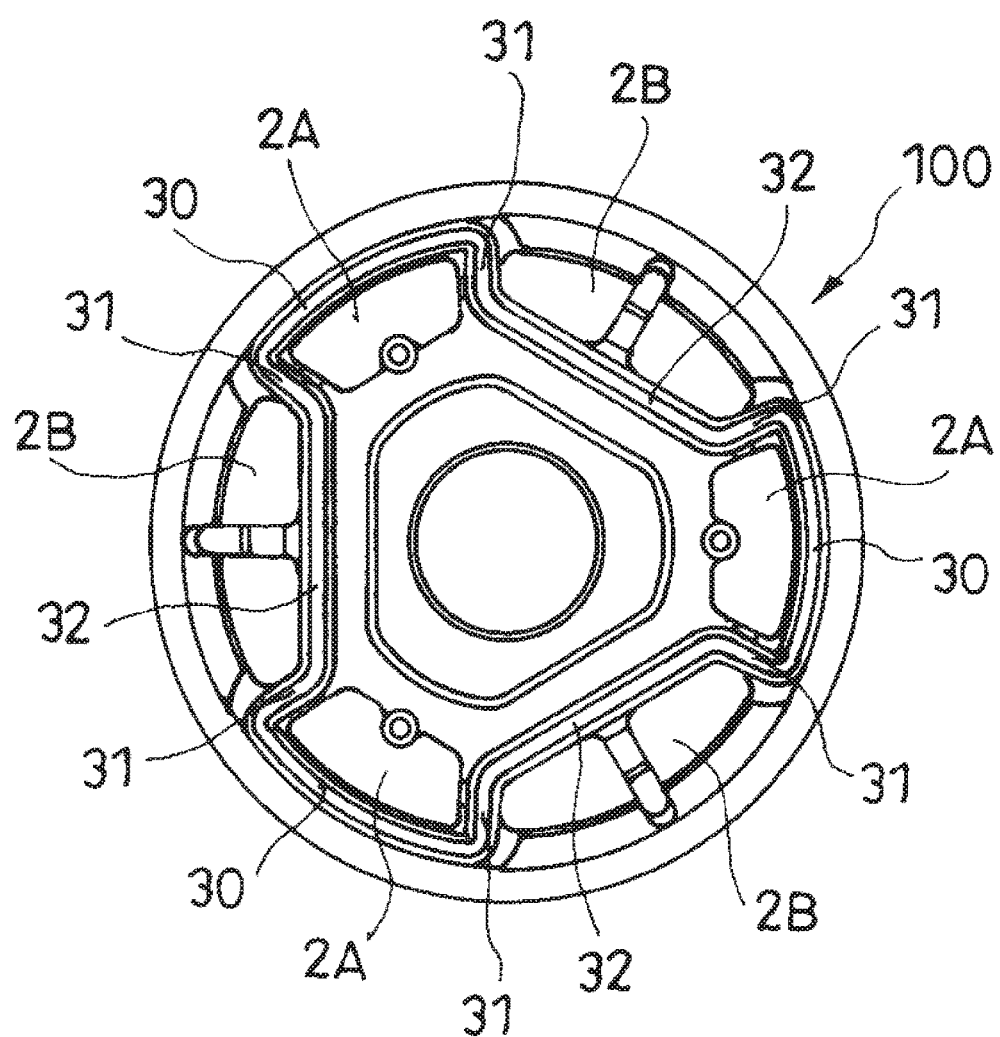
FIG. 10 is a bottom view illustrating a first modification of the piston of the shock absorber according to the embodiment of the present invention.

In the configuration described above, it is possible to easily match the flow passage areas between the expansion-side passage 2A and the contraction-side passage 2B. Note that the arrangement of the middle seat portions 31 can be appropriately changed. For example, as illustrated in FIG. 10, an interval between the middle seat portions 31 connected by the inner seat portion 32 may be different from an interval between the middle seat portions 31 connected by the outer seat portion 30. In this case, it is possible to make a difference between the flow passage area of the expansion-side passage 2A and the flow passage area of the contraction-side passage 2B. If the flow passage area of the contraction-side passage 2B is larger than the flow passage area of the expansion-side passage 2A as in a piston 100 in a configuration of FIG. 10, it is possible to increase the damping force generated by the shock absorber S during expansion of the shock absorber S in the medium-high piston speed range and reduce the damping force generated by the shock absorber S during contraction of the shock absorber S.

Figure 11:
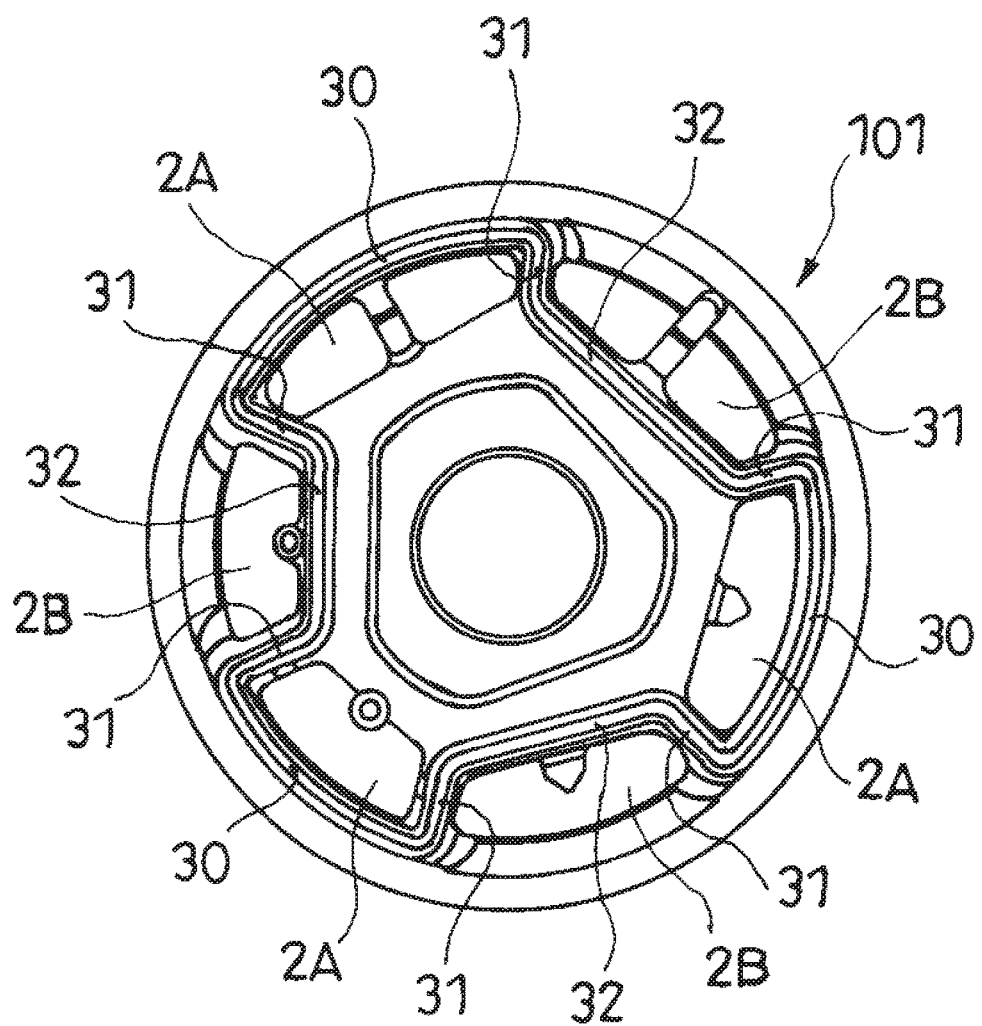
FIG. 11 is a bottom view illustrating a second modification of the piston of the shock absorber according to the embodiment of the present invention.

As illustrated in FIG. 11, the plurality of outer seat portions 30 of the expansion-side seat 3A or the contraction-side seat 3B are provided on the same circumference, and respective lengths of these outer seat portions 30 in the circumferential direction may be different from each other. In such piston 101, it is possible to make a difference in the flow passage area between the plurality of expansion-side passages 2A and make a difference in the flow passage area between the plurality of contraction-side passages 2B. Therefore, it is possible to slowly open the expansion-side valve body 4A from a portion facing the expansion-side passage 2A having a large flow passage area or slowly open the contraction-side valve body 4B from a portion facing the contraction-side passage 2B having a large flow passage area. For this reason, it is possible to moderate a change (dashed line in FIG. 9) generated when switching from the orifice characteristic damping force of the low piston speed range to the valve characteristic damping force of the middle-high piston speed range. As a result, it is possible to further improve a vehicle ride quality.

According to this embodiment, the expansion-side valve body 4A has the subsidiary valve 40 seated on and unseated from the expansion-side seat 3A and the notched leaf valve 41 stacked on the side of the subsidiary valve 40 opposite to the piston (the side opposite to the valve disk). The subsidiary valve 40 is provided with the hole 40a facing the inner side of the expansion-side seat 3A. Similarly, the contraction-side valve body 4B has the subsidiary valve 40 seated on and unseated from the contraction-side seat 3B and the notched leaf valve 41 stacked on the side of the subsidiary valve 40 opposite to the piston (the side opposite to the valve disk). In addition, the subsidiary valve 40 is provided with the hole 40a facing the inner side of the contraction-side seat 3B. Each notched leaf valve 41 is provided with the notch 41a extending from the outer circumference end of the notched leaf valve 41 toward the center. The notch 41a has the strait portion 41 provided on the outer circumference side to form a throttle flow channel and the communicating portion 41c provided on the center side to face the hole 40a.

In the configuration described above, when the piston speed is in the low speed range, and the pressure difference between the expansion-side chamber L1 and the contraction-side chamber L2 during expansion does not reach a valve opening pressure of the expansion-side valve body 4A, and when the pressure difference between the expansion-side chamber L1 and the contraction-side chamber L2 during contraction does not reach a valve opening pressure of the contraction-side valve body 4B, the shock absorber S can generate a damping force caused by the resistance of the throttle flow channel formed by the strait portion 41b. In addition, due to the subsidiary valve 40, there is no need to align the notched leaf valve 41 and the piston 1 in the circumferential direction. This facilitates an assembly work of the shock absorber S. Furthermore, since the damping force in the low speed range can be adjusted by changing the width and the length of the strait portion 41b of the notched leaf valve 41, it is possible to improve the degree of freedom in an adjustment of the damping force.

Figure 12:
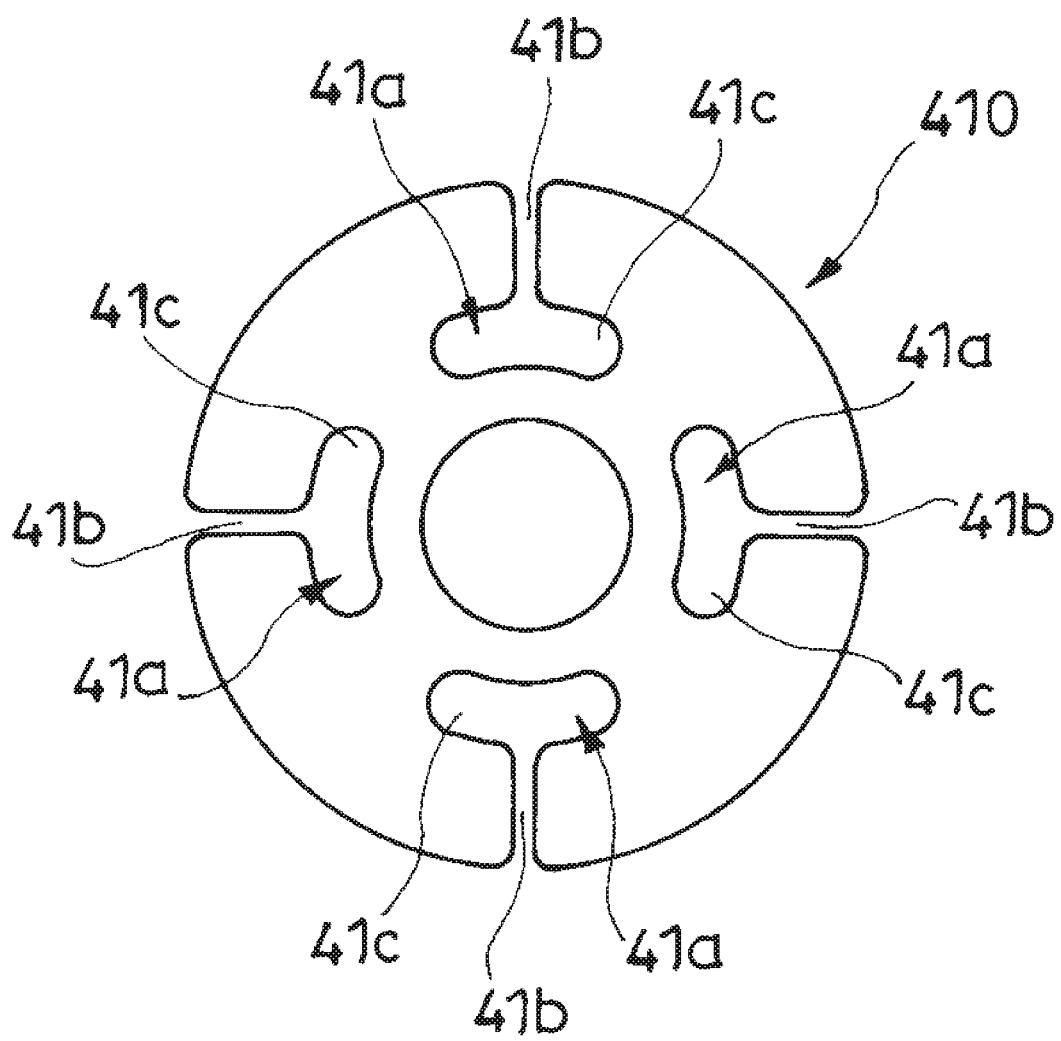
FIG. 12 is a plan view illustrating a modification of the notched leaf valve of the shock absorber according to the embodiment of the present invention.

Note that only one of the expansion-side valve body 4A and the contraction-side valve body 4B may have the aforementioned configuration. In addition, if the strait portion 41b of the notched leaf valve 41 and the outer seat portion 30 are aligned to overlap each other, it is not necessary to include the subsidiary valve 40. Furthermore, it is not necessary to provide the subsidiary valve 40 and the notched leaf valve 41 if an orifice is formed in the expansion-side seat 3A and the contraction-side seat 3B by stamping. According to this embodiment, the length of the strait portion 41b is short, and the throttle flow channel serves as an orifice. Alternatively, as in a notched leaf valve 410 illustrated in FIG. 12, the strait portion 41b may be long so that the throttle flow channel serves as a choke passage. In this case, when the piston speed is in the low speed range, the shock absorber S generates a choke characteristic damping force.

According to this embodiment, the four holes 40a of the subsidiary valve 40 are formed in an arc shape and are provided on the same circumference at equal intervals in the circumferential direction. Here, for example, if one hole 40*a* of the subsidiary valve 40 is provided in a circular arc shape, a stress is concentrated between both the ends of the hole 40*a* when the subsidiary valve 40 is bent. In contrast, if the holes 40*a* of the subsidiary valve 40 are formed as described above, it is possible to distribute the stress between the neighboring holes 40*a* and improve durability of the subsidiary valve 40. Note that the shape and the number of the holes 40*a* of the subsidiary valve 40 may be appropriately changed.

According to this embodiment, the shock absorber S includes the piston (valve disk) 1 for partitioning the expansion-side chamber L1 and the contraction-side chamber L2 (the two chambers), the expansion-side passage 2A and the contraction-side passage 2B provided in the piston 1 to allow the expansion-side chamber L1 and the contraction-side chamber L2 to communicate with each other and arranged alternately side by side along the circumferential direction, the expansion-side seat (seat) 3A formed on the lower side (one side) of the piston 1 to surround the outlet port of the expansion-side passage 2A, the contraction-side seat (seat) 3B formed on the upper side (the other side) of the piston 1 to surround the outlet port of the contraction-side passage 2B, the expansion-side valve body (valve body) 4A stacked on the lower side of the piston 1 to open and close the expansion-side passage 2A, and the contraction-side valve body (valve body) 4B stacked on the upper side of the piston 1 to open and close the contraction-side passage 2B.

Each of the expansion-side seat 3A and the contraction-side seat 3B has the arc-shaped outer seat portion 30, the pair of middle seat portions 31 extending from both the ends in the circumferential direction of the outer seat portion 30 toward the center axis X side of the piston 1, and the inner seat portion 32 extending from the center axis X side ends of the middle seat portions 31 oppositely to the outer seat portion side in the circumferential direction to connect the neighboring middle seat portions 31.

The outlet port 12 of the expansion-side passage 2A is placed inward of the expansion-side seat 3A between the middle seat portions 31 connected by the outer seat portion 30 of the expansion-side seat 3A. The inlet port 13 of the contraction-side passage 2B is placed outward of the expansion-side seat 3A between the middle seat portions 31 connected by the inner seat portion 32 of the expansion-side seat 3A.

The outlet port 15 of the contraction-side passage 2B is placed inward of the contraction-side seat 3B between the middle seat portions 31 connected by the outer seat portion 30 of the contraction-side seat 3B. The inlet port 16 of the expansion-side passage 2A is placed outward of the contraction-side seat 3B between the middle seat portions 31 connected by the inner seat portion 32 of the contraction-side seat 3B.

Further, the inner seat portion 32 of the expansion-side seat 3A and the inner seat portion 32 of the contraction-side seat 3B are provided on the straight line Y that connects the center axis X side ends of the middle seat portions 31.

In the configuration described above, the inner seat portion 32 is provided on the straight line Y that connects the center axis X side ends of the middle seat portions 31. Therefore, the flow passage areas of the expansion-side passage 2A and the contraction-side passage 2B can be widened toward the center side of the piston 1. Therefore, it is possible to sufficiently reduce the damping coefficient in the medium-high piston speed range.

Note that, according to this embodiment, the inner seat portion 32 has a straight shape to match the straight line Y.

The inner seat portion 32 may be provided on the straight line Y or in the center axis X side with respect to the straight line Y such that it does not protrude toward the outer circumference side of the piston 1 out of the straight line Y. The inner seat portion 32 may have, for example, an arc shape warped toward the center axis X side. In addition, only one of the expansion-side seat 3A and the contraction-side seat 3B may have the aforementioned configuration.

Embodiments of this invention were described above, but the above embodiments are merely examples of applications of this invention, and the technical scope of this invention is not limited to the specific constitutions of the above embodiments.

This application claims priority based on Japanese Patent Application No. 2014-146592 filed with the Japan Patent Office on Jul. 17, 2014, the entire contents of which are incorporated into this specification.

The invention claimed is:

1. A shock absorber, comprising:
   a valve disk configured to partition two chambers;
   a plurality of expansion-side passages and a plurality of contraction-side passages formed in the valve disk, the expansion-side passages and the contraction-side passages being alternately arranged side by side along a circumferential direction, allowing the two chambers to communicate with each other;
   a seat formed on a first surface of the valve disk to surround an outlet port of each said expansion-side passage or an outlet port of each said contraction-side passage;
   a valve body stacked on the valve disk, the valve body being configured to open and close each said expansion-side passage or each said contraction-side passage; and
   a window formed on the valve disk and disposed on an inner circumferential side of the valve disk with respect to the seat, the expansion-side passages communicating with each other or the contraction-side passages communicating with each other, through the window, between the valve body and the valve disk when the valve body is seated on the seat, the window including
   an outer peripheral end having a large diameter portion and a small diameter portion, a distance between a center of the valve disk and the large diameter portion in a plan view of the valve disk being greater than a distance between the center of the valve disk and the small diameter portion, and
   an inner peripheral end having a first portion facing the large diameter portion of the outer peripheral end, and a second portion facing the small diameter portion of the outer peripheral end, a distance between the center of the valve disk and the first portion being greater than a distance between the center of the valve disk and the second portion.

2. The shock absorber according to claim 1, wherein the seat includes:
   a plurality of arc-shaped outer seat portions each of which has two ends opposite to each other in a circumferential direction thereof, and being provided on a circumference of a same circle, each said outer seat portion having a length in the circumferential direction different from one another;
   middle seat portions each having an outer seat portion side end and a center axis side end, each said outer seat portion side end extending from a corresponding one of two ends of a corresponding one of the outer seat portions toward a center axis of the valve disk; and a plurality of inner seat portions each of which connects center axis side ends of corresponding two adjacent middle seat portions, wherein the outlet port of each said expansion-side passage or the outlet port of each said contraction-side passage is placed inward of the seat and between the middle seat portions connected by a corresponding one of the outer seat portions, an inlet port of each said contraction-side passage or an inlet port of each said expansion-side passage is placed outward of the seat and between the middle seat portions connected by a corresponding one of the inner seat portions, the inner seat portion is placed on a straight line that connects the center axis side ends of the middle seat portions or at a side of the center axis with respect to the straight line.

3. The shock absorber according to claim 2, wherein the valve body includes:

a subsidiary valve seated on and unseated from the seat; and a notched leaf valve stacked on a side of the subsidiary valve opposite to the valve disk, the subsidiary valve is provided with a hole facing the inner side of the seat, the notched leaf valve is provided with a notch formed from an outer circumference end of the notched leaf valve toward a center thereof, and the notch includes:

a strait portion provided in an outer circumference side of the notched leaf valve to form a throttle flow channel; and a communicating portion provided in a center side of the notched leaf valve to face the hole.

4. The shock absorber according to claim 2, wherein an interval between the middle seat portions connected by the outer seat portion is different from an interval between the middle seat portions connected by the inner seat portion.

5. The shock absorber according to claim 1, wherein the seat includes:

an arc-shaped outer seat portion having two ends opposite to each other in a circumferential direction thereof;

middle seat portions each having an outer seat portion side end and a center axis side end, each said outer seat portion side end extending from a corresponding one of two ends of the outer seat portion toward a center axis of the valve disk; and an inner seat portion connecting center axis side ends of two adjacent middle seat portions, wherein the outlet port of each said expansion-side passage or the outlet port of each said contraction-side passage is placed inward of the seat and between the middle seat portions connected by the outer seat portion, an inlet port of each said contraction-side passage or an inlet port of each said expansion-side passage is placed outward of the seat and between the middle seat portions connected by the inner seat portion, the inner seat portion is placed on a straight line that connects the center axis side ends of the middle seat portions or at a side of the center axis with respect to the straight line, the valve body has a subsidiary valve provided with a hole facing an inner side of the seat and configured to seat on and unseat from the seat, the valve disk has a boss portion formed in the inner side of the seat, and a part of the boss portion facing the outer seat portion has a width wider than that of a part of the boss portion facing the inner seat portion.

6. The shock absorber according to claim 5, wherein the valve body includes:

a subsidiary valve seated on and unseated from the seat; and a notched leaf valve stacked on a side of the subsidiary valve opposite to the valve disk, the subsidiary valve is provided with a hole facing the inner side of the seat, the notched leaf valve is provided with a notch formed from an outer circumference end of the notched leaf valve toward a center thereof, and the notch includes:

a strait portion provided in an outer circumference side of the notched leaf valve to form a throttle flow channel; and a communicating portion provided in a center side of the notched leaf valve to face the hole.

7. The shock absorber according claim 5, wherein an interval between the middle seat portions connected by the outer seat portion is different from an interval between the middle seat portions connected by the inner seat portion.

8. The shock absorber according to claim 1, further comprising another seat formed on a second surface of the valve disk to surround the outlet port of each said expansion-side passage or an outlet port of each said contraction-side passage, the second surface being opposite to the first surface of the valve disk.

9. The shock absorber according to claim 1, wherein the window includes a first window formed on the first surface of the valve disk, through which the expansion-side passages communicate with each other, and a second window formed on the second surface of the valve disk, through which the contraction-side passages communicate with each other.

10. The shock absorber according to claim 1, wherein the seat includes:

an arc-shaped outer seat portion having two ends opposite to each other in a circumferential direction thereof;

middle seat portions each having an outer seat portion side end and a center axis side end, each said outer seat portion side end extending from a corresponding one of two ends of the outer seat portion toward a center axis of the valve disk; and an inner seat portion connecting center axis side ends of two adjacent middle seat portions, the outlet port of each said expansion-side passage or the outlet port of each said contraction-side passage is placed inward of the seat and between the middle seat portions connected by the outer seat portion, an inlet port of each said contraction-side passage or an inlet port of each said expansion-side passage is placed outward of the seat and between the middle seat portions connected by the inner seat portion, and the inner seat portion is placed on a straight line that connects the center axis side ends of the middle seat portions or at a side of the center axis with respect to the straight line.

11. The shock absorber according to claim 10, wherein the valve body includes:
   a subsidiary valve seated on and unseated from the seat; and
   a notched leaf valve stacked on a side of the subsidiary valve opposite to the valve disk,
the subsidiary valve is provided with a hole facing the inner side of the seat,
the notched leaf valve is provided with a notch formed from an outer circumference end of the notched leaf valve toward a center thereof, and
the notch includes:
   a strait portion provided in an outer circumference side of the notched leaf valve to form a throttle flow channel; and
   a communicating portion provided in a center side of the notched leaf valve to face the hole.

12. The shock absorber according to claim 10, wherein an interval between the middle seat portions connected by the outer seat portion is different from an interval between the middle seat portions connected by the inner seat portion.

13. The shock absorber according to claim 1, wherein the window is formed to cover
   an area in which outlet ports of the plurality of expansion-side passages or inlet ports of the plurality of contraction-side passages are formed in the valve disk, or
an area in which inlet ports of the plurality of expansion-side passages or outlet ports of the plurality of contraction-side passages are formed in the valve disk, so that the plurality of expansion-side passages or the plurality of contraction-side passages communicate with each other through the window when the valve body is seated on the seat.

* * * * *